United States Patent

[11] 3,593,407

[72] Inventor Dwight C. Brown
  414 N. Granada St., Arlington, Va. 22203
[21] Appl. No. 774,020
[22] Filed Nov. 7, 1968
[45] Patented July 20, 1971

[54] METHOD OF MAKING A PALLET
  9 Claims, 12 Drawing Figs.
[52] U.S. Cl. ................................................. 29/416,
  29/412, 29/428, 108/52, 108/57, 144/314, 144/319
[51] Int. Cl. .................................................... B23p 17/00
[50] Field of Search ........................................... 108/52, 57;
  144/309, 316, 314, 319; 29/412, 416, 163.5, 425,
  428; 156/152, 250, 251

[56] References Cited
UNITED STATES PATENTS

| | | | |
|---|---|---|---|
| 89,172 | 4/1869 | Rowe | 144/314 X |
| 484,063 | 10/1892 | Studte | 144/316 |
| 509,770 | 11/1893 | Scott | 29/416 X |
| 652,990 | 7/1900 | Wood | 29/416 X |
| 2,468,026 | 4/1949 | Boone | 108/57 |
| 2,479,728 | 8/1949 | Darling | 108/57 |
| 2,625,355 | 1/1953 | Adams | 108/52 |
| 2,996,276 | 8/1961 | Sorensen et al. | 108/57 |

Primary Examiner—Charlie T. Moon
Assistant Examiner—Ronald J. Shore
Attorney—Brufsky, Staas, Breiner and Halsey ABSTRACT: A method for making a pallet and the pallet produced by cutting a piece of solid sheet material and using the cut portion and remaining portion of said solid sheet as two separate pallet decks of substantially the same dimension as the original solid piece.

PATENTED JUL 20 1971

INVENTOR.
DWIGHT C. BROWN

BY
Braufsky & Staas
ATTORNEYS

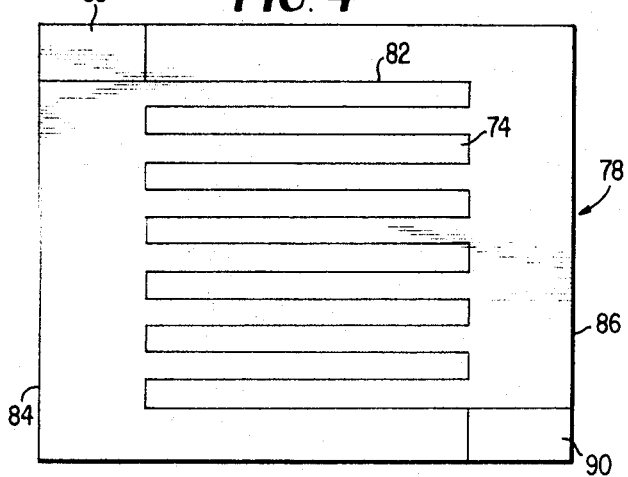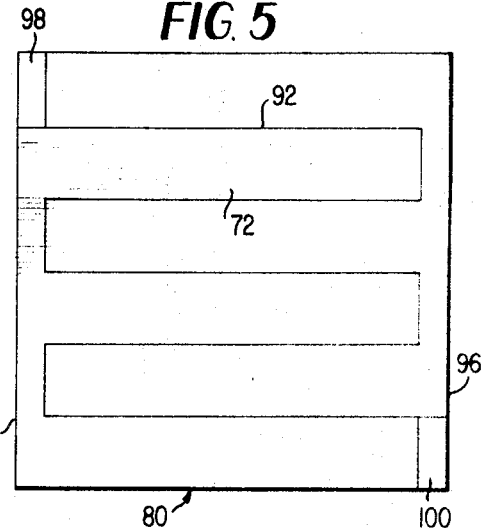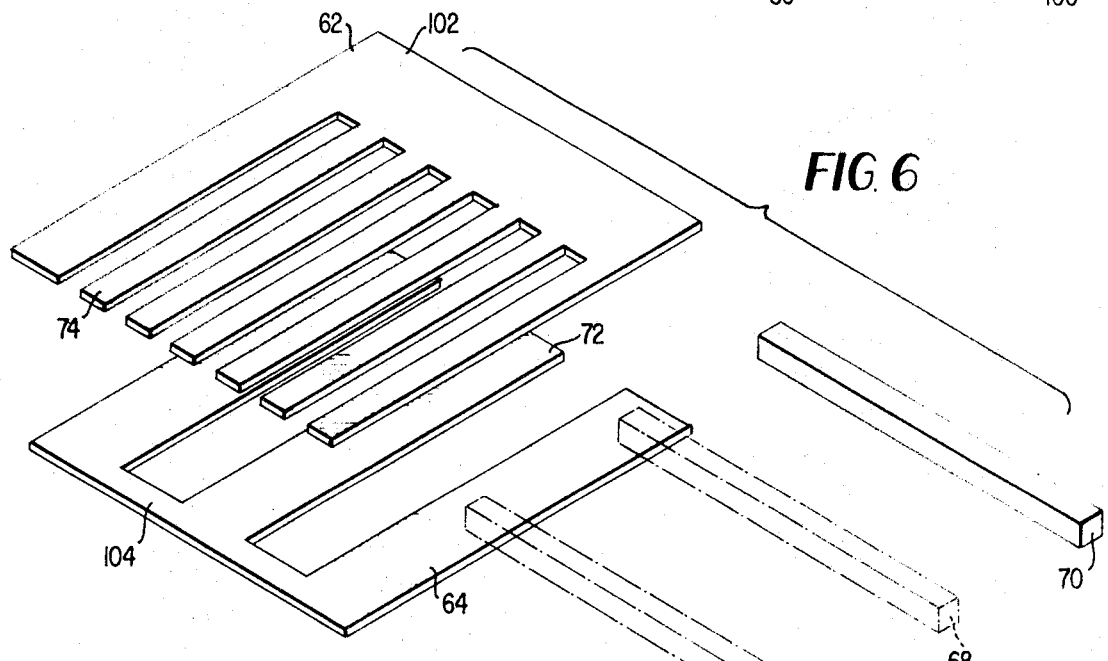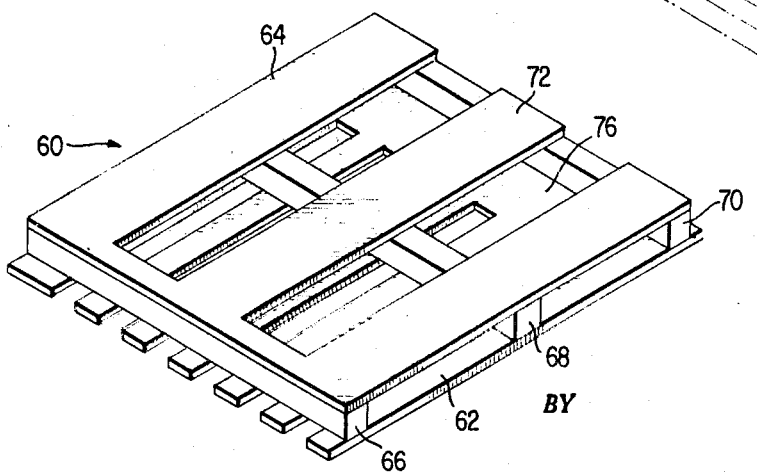

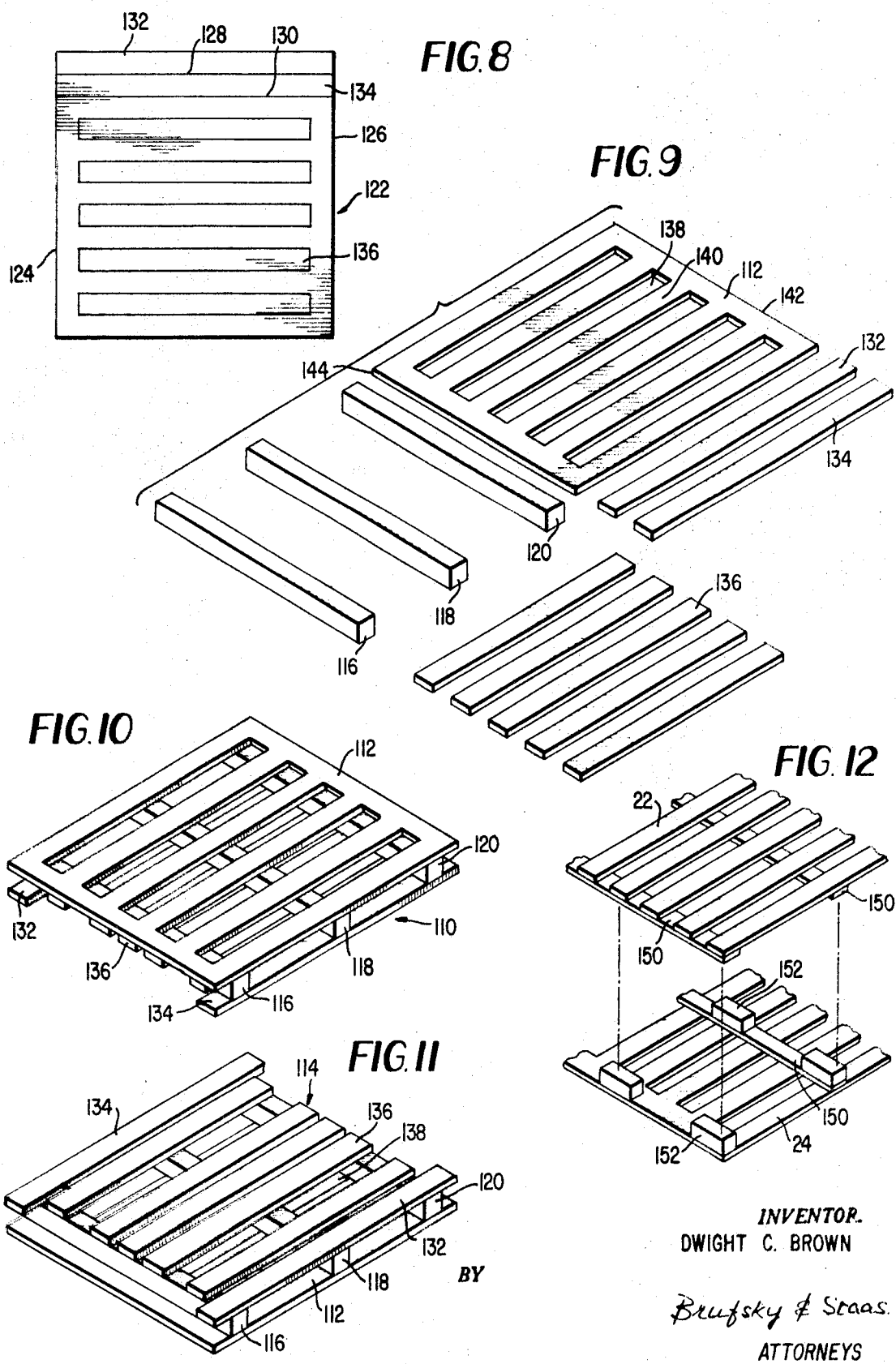

3,593,407

METHOD OF MAKING A PALLET

BACKGROUND OF THE INVENTION

This invention relates to a novel method for constructing a pallet and the resultant pallet structure.

The top and bottom decks of conventional wooden pallets are usually constructed from individual, spaced apart lumber boards or from a solid sheet of plywood material. The construction of pallet decks from multiple, individual deckboards requires the use of various width boards to provide required spacing and overall pallet dimensions. In addition, the use of individual boards in lieu of solid sheet material, generally requires jigs or pattern frames to hold the boards in proper location during fastening to runner, stringer, block support, or other spacer components.

The use of sheet material such as plywood, provides faster and lower cost pallet construction than would otherwise be the case using conventional, individual lumber deckboards. Despite this advantage, pallets having decks of solid sheet material, particularly plywood, are too expensive for wide use.

Plywood pallets are constructed from plywood material available in standard length and width sheets. For fabrication of a standard size 40 inch by 48 inch pallet, a 4 foot by 8 foot sheet of plywood is cut in half to provide a full top and bottom deck with a resulting waste trim 8 inches wide by 96 inches long. While the resultant pallet is sturdy and easy to assemble since it involves handling of only one piece of lumber for the top deck and one piece for the bottom deck, the use of solid plywood sheet decking because of its waste factor and high cost, is in many instances prohibitive.

SUMMARY OF THE INVENTION

The method of constructing a pallet according to this invention makes it possible to obtain two integral pallet decks from one solid sheet of material having dimensions only slightly larger than the resulting pallet and used heretofore as one solid deck.

The resulting deck structure is similar to that provided where the deck is formed from multiple, spaced-apart, individual boards, but at least three sides of the pallet deck are integrally connected which enables handling of the deck as a single unit and provides additional overall deck strength and rigidity than would otherwise be obtained by the use of individual boards. In addition, this closed end feature reduces and prevents damage to the deck commonly experienced in stacking by use of fork lift equipment.

Accordingly, it is an object of this invention to provide a more economical method of constructing a pallet from solid sheet material.

A further object of this invention is to provide two pallet decks from one solid sheet of material having only slightly larger dimensions than the pallet.

A still further object of the invention is to provide low cost, one piece pallet size deck units having the same fast and low cost pallet construction features as solid sheet material.

These objects are accomplished by cutting standard size plywood sheets into multiple pieces slightly larger than the desired pallet size. Each piece is then cut into two pallet decks which can be secured to a group of pallet runners or to stringer boards secured to post-type supports.

In one embodiment of the invention, boards are cut from a pallet size piece of sheet material in a zigzag pattern starting from an edge thereof and terminating in an opposed edge. The cut piece of sheet material and the boards cut from the sheet material are secured to a group of pallet stringers or the like to form individual pallet decks. The boards cut from the sheet material are all interconnected by a transverse board section which makes it possible to retain a considerable rigidity of the original solid sheet. In another embodiment of the invention, the boards are cut wholly from the interior of the sheet material, leaving a border on the perimeter of the original piece of material, making it possible to retain to a great extent the same rigidity and load capacity as a deck made of solid sheet material.

BRIEF DESCRIPTION OF THE DRAWINGS

Further objects and advantages of the invention will become apparent from the following specification and claims, and from the accompanying drawings wherein:

FIG. 4 is a top plan view of a piece of sheet material cut in accordance with another embodiment of the method of the invention, said sheet of material being used to form two top decks on different pallets;

FIG. 5 is a top plan view of a piece of sheet material cut to provide two bottom decks for use with the top decks provided by the sheet material illustrated in FIG. 4;

FIG. 6 is an exploded perspective view of a pallet constructed by using a top and bottom deck formed in the manner illustrated in FIGS. 4 and 5, respectively;

FIG. 7 is a perspective view of the pallet components shown in FIG. 6 assembled to form a "wing" type pallet, turned upside down;

FIG. 8 is a top plan view of a piece of sheet material cut in accordance with yet another embodiment of the method of this invention;

FIG. 9 is an exploded perspective view showing pallet runners and the deck elements of the pallet which can be constructed from the sheet of material cut in FIG. 8;

FIG. 10 is a perspective view of the pallet which can be constructed using the elements shown in FIG. 9;

FIG. 11 is a perspective view of the pallet shown in FIG. 10 turned upside down; and FIG. 12 is a fragmentary, exploded perspective of another pallet which can be constructed using the pallet decks shown in FIG. 2.

DESCRIPTION OF THE PREFERRED EMBODIMENTS

Figure 1:
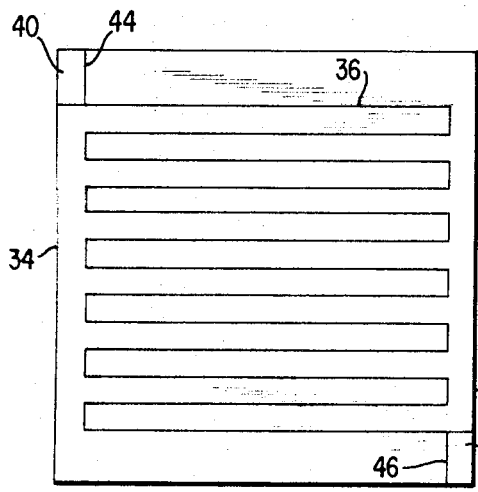
FIG. 1 is a top plan view of a piece of sheet material cut in accordance with one embodiment of the method of this invention.
Figure 2:
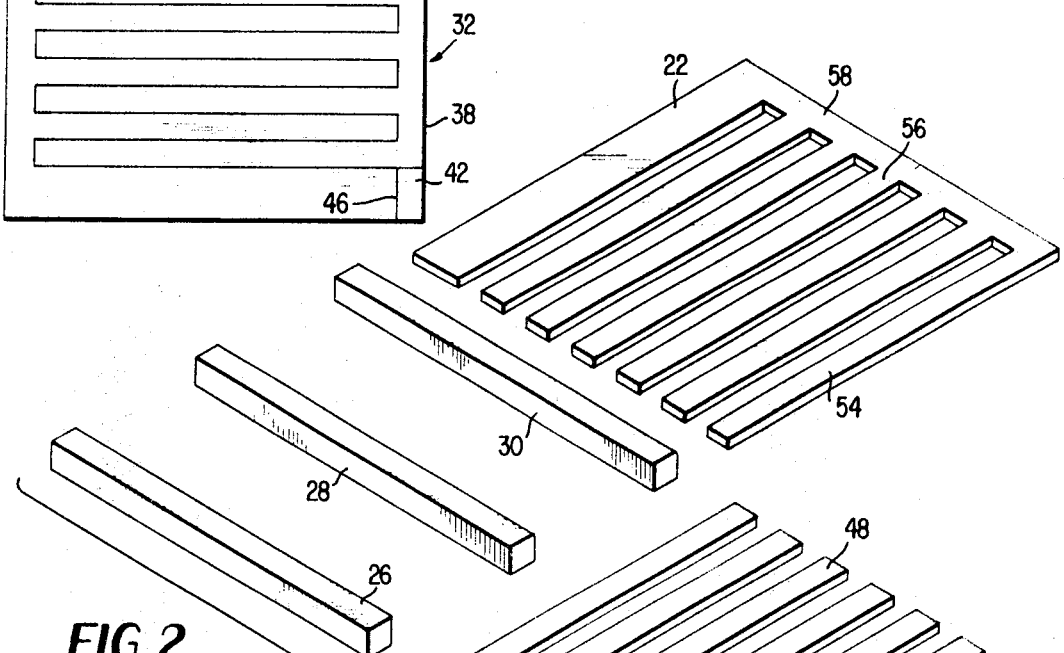
FIG. 2 is an exploded perspective view of a pallet constructed by using the cut material illustrated in FIG. 1 as separate pallet decks.
Figure 3:
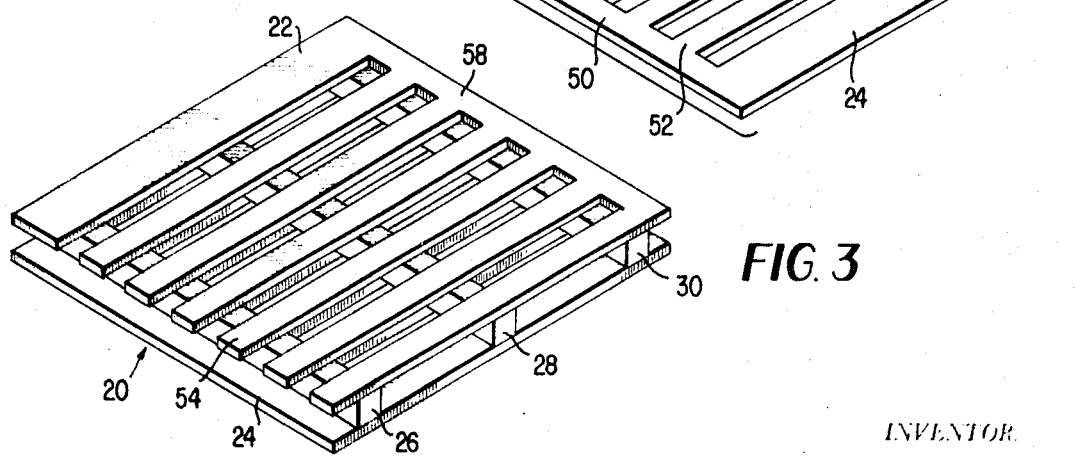
FIG. 3 is a perspective view of the pallet components illustrated in FIG. 2, assembled to provide a "wing" type pallet.

Referring now to the drawings in detail, and particularly, to the embodiment of the invention illustrated in FIGS. 1 to 3, inclusive, a pallet generally designated by the numeral 20 having a top deck 22 and a bottom deck 24 secured to spaced runners 26, 28, and 30 is adapted to be constructed from a single piece of planar sheet material generally designated by the numeral 32. For many normal size pallets, sheet material 32 would represent approximately one-half of a standard size plywood sheet, which is usually provided in rectangular, 4 foot by 8 foot, 4 foot by 9 foot, 4 by 10 foot, or 4 foot by 12 foot, sections.

As best illustrated in FIG. 1, sheet material 32 is sawed, routed, or die-cut starting at one lateral edge 34 and proceeding with a zigzag cut 36 terminating in the opposite parallel, lateral edge 38. The diagonally opposite upper left and lower right corners 40, 42, respectively, of sheet material 32, are also cut along vertical lines 44, 46, respectively, for a purpose which will become apparent hereinafter. Line 44 is coextensive with the left-hand terminus of the intermediate portions of zigzag cut 36 in FIG. 1, while line 46 is coextensive with the right-hand terminus of the intermediate portions of zigzag cut 36 in FIG. 1.

After the cutting operation has been completed, the cut piece of sheet material 32 can be separated to provide the top deck 22 and the bottom deck 24 of pallet 20. The only waste material are the diagonal corners 40 and 42.

As shown in FIG. 2, the resultant bottom deck 24 includes a plurality of elongated relatively narrow boards 48. The boards 48 are integrally connected by a coplanar transverse deck board section 50 connected to each board 48 along their coextensive edges 52. Similarly, by removing boards 48 from the interior of sheet material 32, top pallet deck 22 is provided with a plurality of elongated relatively narrow boards 54 joined along coextensive edges 56 by a coplanar, integral, transverse deck board section 58.

It is only necessary to provide a group of runners 26, 28, and 30 to complete the construction of a "wing" or "flush" deck-type pallet. Top deck 22 and bottom deck 24 are secured to the runners in any conventional manner, such as by nails, with their respective transverse deck board sections in reverse position. As is well known in the art, the forks of a conventional pallet lift truck can be inserted into the channels formed between runners 26, 28 and 28, 30 to lift the pallet and its load. Because of the transverse deck board sections 50 and 58 connecting boards 48 and 54, respectively, the rigidity and strength of the resultant pallet structure is greatly increased over a pallet construction having individual, unconnected boards. Although the use of a solid sheet material deck may provide slightly greater strength, a full solid deck is generally not needed and on the contrary, the spacing between all deck boards on each deck is essential for many pallet uses that require air circulation for various types of commodities during storage. In any event, the use of sheet material 32 to form both a top and bottom pallet deck substantially reduces the cost of construction of the pallet since both a bottom and top pallet deck are formed from a piece of material slightly larger than that heretofore used in constructing one deck only. The only waste material in forming pallets 20 are corners 40, 42 which are removed so that the top and bottom pallet decks can be properly aligned with respect to each other.

FIGS. 4 to 7, inclusive, illustrate still another manner of practicing the method of the present invention. The method used in connection with fabricating the bottom deck of pallet 60 is particularly applicable where the pallets are to be handled by a conventional hand-type pallet lift truck rather than the conventional forklift truck.

Pallet 60 includes a top deck 62 and a bottom deck 64 secured to a group of runners 66, 68, and 70. The major difference between top deck 62 and bottom deck 64 is that the boards 72 of bottom deck 64 are fewer in number and spaced a greater distance apart than the boards 74 of top deck 62. As best illustrated in FIG. 7, deckboards 72 of bottom deck 64 are spaced a sufficient distance apart to admit entry of the wheels of a hand-type pallet lift truck in the space 76 between adjacent boards. On the other hand, the conventional forklift truck may also be used with pallet 60 by having the forks inserted between runners 66, 68, and 68, 70.

In fabricating pallet 60, a standard sheet of plywood is separated into approximately two halves 78, as shown in FIG. 4, and 80, as shown in FIG. 5. As in the method described in connection with the formation of pallet 20 in FIGS. 1 to 3, sheet material 78 having a longer length than in FIG. 1 is cut in a zigzag pattern along a line 82 extending from edge 84 to parallel lateral edge 86. Diagonal corners 88 and 90 are removed as before, as waste. Similarly, sheet material 80 is cut along zigzag line 92 extending from one lateral edge 94 to the opposite parallel lateral edge 96. Diagonal corners 98 and 100 are removed as waste. One key difference between the cuts 82 and 92 is that the lateral portions of the cut 92 are spaced a greater vertical distance than the lateral portions of the cut 82, providing a wider deck board 72 than deck board 74. When sheet material 78 is separated into two halves, each half is used as a top pallet deck 62 while the separated halves of sheet material 80 each provide a bottom pallet deck 64.

Four deck boards for two pallets are still formed from a single-standard size sheet of material. The top and bottom pallet decks 62, 64, respectively, are also provided with coplanar, integral transverse deck board sections 102, 104, respectively, for increasing the strength and rigidity of the resultant pallet 60.

In FIG. 4 the half sheet of material has a greater length than in FIG. 1 and FIG. 5. For the same size pallet deck, the longer half sheet provides a wider coplanar transverse deck board section which adds to the pallet rigidity. This variable width feature of the transverse deck board section together with the variable width of the deck boards, makes it possible to construct most all pallet sizes with little waste of solid sheet material. The dimensions of these variables will normally be determined by the size of the pallet and the dimensions, particularly the length, of the standard size sheet material available.

FIGS. 8 to 11, inclusive, illustrate yet another manner of fabricating a pallet in accordance with this invention.

The pallet shown in FIGS. 10 and 11, and generally designated by the numeral 110, includes a top deck 112 and a bottom deck 114 secured to runners 116, 118, and 120.

As illustrated in FIGS. 8 and 9, a standard size sheet of plywood, such as a 4 foot by 8 foot section, is cut in half to provide planar 48 inch by 48 inch halves 122. In lieu of the zigzag cut described heretofore, sheet material 122 is cut completely from one lateral edge 124 to the opposite parallel edge 126 along lines 128 and 130 to provide a pair of pallet end boards 132 and 134 for the bottom deck. Cuts 128 and 130 are made approximately at 4 inch intervals commencing with the top edge of sheet material 122.

A plurality of deck boards 136 are then cut wholly from the interior of sheet material 122 leaving a plurality of slots 138 in sheet material 122. The remaining portion of sheet material 122 is used as the top pallet deck 112 and secured to the top surface of runners 116, 118, and 120. In the example specified, the dimensions of deck 112 would be 40 inches by 48 inches, thus providing full utilization and no waste of sheet material.

Deck boards 136 and end boards 132, 134 are then secured to the lower surface of runners 116, 118, and 120 to form bottom deck 114. As illustrated in FIG. 11, a space can be left between the last deck board 136 adjacent each end board 132 and 134 and the remainder of the deck boards 136 to provide sufficient spacing 138 to receive the wheels of a hand-type pallet lift truck. Pallet 110 can also be used with the conventional fork lift truck as forks can be inserted between runners 116, 118, and 120.

By removing deck boards 136 wholly from the interior of sheet material 122, the deck boards 140 of top pallet deck 112 are connected by coplanar, integral, transverse deck board sections 142 and 144. This fully closed perimeter feature of the resultant pallet structure 110 provides considerable more strength and rigidity than a pallet having separated, unconnected deck boards.

As shown in FIG. 12, the pallet decks 22, 24 shown in FIG. 2 (also the decks shown in FIGS. 6 and 9) may be used to construct full four-way entry pallets. In lieu of runner-type supports, four stringer boards 150 and nine support posts 152 are used to provide a four-way entry pallet. Normally six stringer boards would be required for a four-way entry pallet constructed from decks of separated individual boards. In the four-way entry pallet shown in FIG. 12, the deck support posts 152 are mounted on the two transverse deck board sections, eliminating the need for two stringer boards 152.

The length of the bottom deck boards 136 shown in FIG. 9 provide only the wing-type pallet shown in FIG. 10. Although the pallets in FIGS. 3 and 7 are also shown as wing-type, a flush-type pallet having decks flush with runner or post supports can be made using the zigzag pattern of cutting the solid sheet material shown in FIGS. 1, 4, and 5, since both top and bottom decks have identical dimensions. The runners in this case would be flush with the edges of the decks.

Although only double-deck pallets are shown in the drawings, the method of this invention is applicable to the construction of two-way entry single-deck pallets and also the construction of four-way entry single-deck pallets having stringer boards and post supports.

Furthermore, while the method of this invention has been described in connection with plywood sheet material, it will be understood that the method is also applicable to any other types of sheet material including tempered hardboard, particle board and sheet board made of other materials, including metal and plastic.

What I claim is:

1. The method of constructing a pallet comprising the steps of:

providing a piece of solid planar rectangular sheet material, cutting transverse to the plane of said sheet material a portion of material from said piece of solid rectangular sheet material while leaving at least 3 edges of said rectangular sheet material substantially intact, providing a plurality of supports, and securing substantially all of the remainder of said cut piece of sheet material and substantially all of said portion cut from said sheet material to a group of said supports in an arrangement defining two separate pallet decks of substantially the same dimension as said original solid piece of planar sheet material.

2. The method of claim 1 wherein:
said cut piece of sheet material and said portion cut from said sheet material are secured to opposed surfaces of the same group of supports to form a top and bottom pallet deck, respectively.

3. The method of claim 1 wherein:
said cut piece of sheet material and said portion cut from said sheet material are secured to a separate group of supports to form a pallet deck on each group of supports.

4. The method of claim 1 wherein:
said portion is cut from said piece of solid sheet material in a zigzag pattern starting from an edge thereof and terminating in an opposed parallel edge.

5. The method of claim 1 wherein:
said portion is cut wholly from the interior of said piece of sheet material.

6. The method of claim 5 wherein:
said cut portion is a plurality of individual, relatively narrow boards.

7. The method of claim 4 wherein:
said cut piece of sheet material and said cut portion are secured to opposed surfaces of the same group of supports to form a top and bottom pallet deck, respectively.

8. The method of claim 6 wherein:
said cut piece of sheet material and said boards cut from said sheet material are secured to opposed surfaces of the same group of supports to form a top and bottom pallet deck, respectively.

9. The method of claim 4 wherein:
said cut piece of sheet material and said cut portion are secured to a separate group of supports to form a pallet deck on each group of supports.